Aug. 22, 1950  J. I. YELLOTT ET AL  2,519,619
ACOUSTIC GENERATOR
Filed Aug. 4, 1944
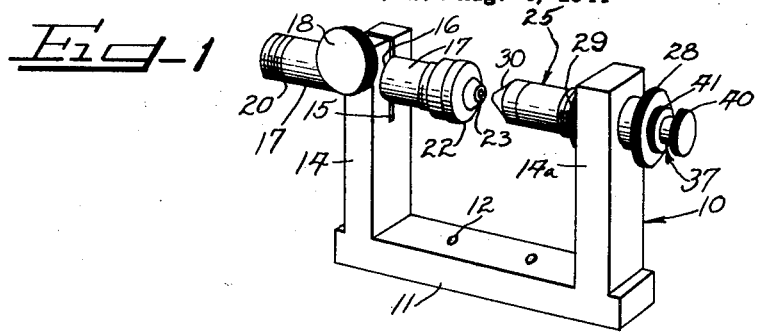
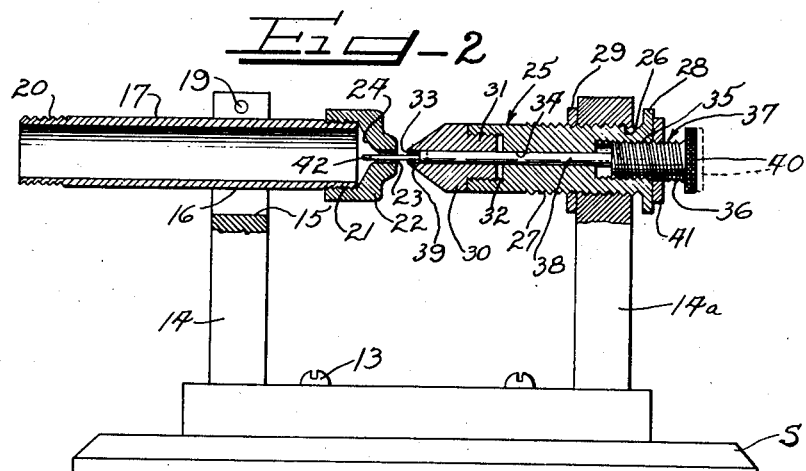
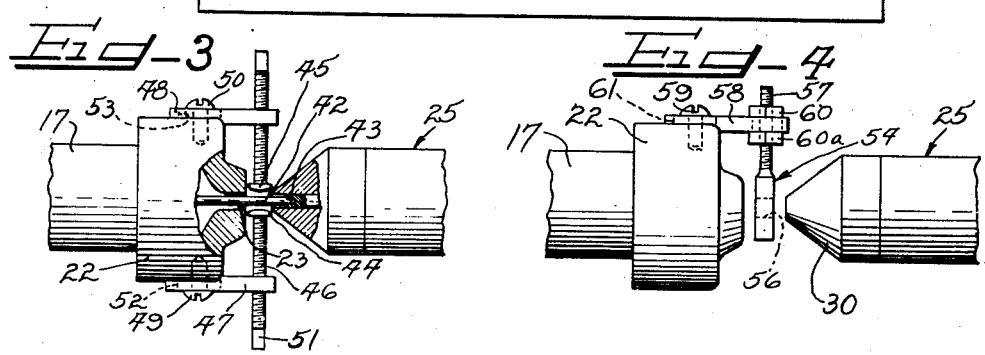
 
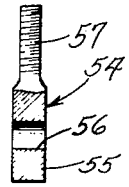 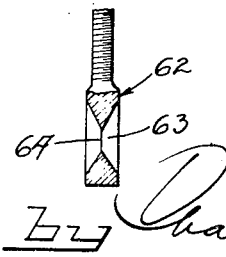
INVENTORS
John I. Yellott
Leonard E. Savory Patented Aug. 22, 1950

2,519,619

UNITED STATES PATENT OFFICE 2,519,619

ACOUSTIC GENERATOR

John I. Yellott, Chicago, Ill., and Leonard E. Savory, New York, N. Y., assignors to Institute of Gas Technology, Chicago, Ill., a corporation of Illinois Application August 4, 1944, Serial No. 548,133

14 Claims. (Cl. 116—137)

1

This invention relates to an acoustic generator for the generation of sonic and supersonic waves.

Supersonic waves are vibrations with frequencies above those in the range of audibility. Such waves can be transmitted in any direction with great energy intensities. The most used method of producing supersonic waves is that of converting electrical vibrations into mechanical vibrations, but other methods are known including the so-called Hartmann acoustic generator using an air jet as the source of energy.

Hartmann found ("Hartmann Acoustic Generator," Engineering, 142, 491, 1936) that when the air velocity in the air jet exceeds that of sound, i. e., when the absolute pressure is 1.9 atmospheres or above, a periodic curve was obtained by plotting a Pitot gauge reading against the distance of the Pitot tube from the nozzle. It was found impossible, however, to obtain satisfactory Pitot readings over parts of the curve where the pressure increased in the direction of flow.

Subsequently, Hartmann replaced the Pitot tube by a spherical, wide-mouthed flask, called a pulsator. In this arrangement, the air entered the flask and discharged very regularly when, and only when, the mouth of the flask was in one of the intervals of instability. The period of pulsation depended upon the diameter of the jet or nozzle, the size of the pulsator flask, and the position of the mouth of the flask in the jet stream.

Later, a cylindrical oscillator was employed to replace the pulsator. The oscillator had in its tip a hole or well of approximately the same diameter as the nozzle orifice and was constructed so that the depth of the well could be varied. Harmonic vibrations with a frequency coinciding roughly with the natural vibrations of the oscillator tube were produced.

Generators of the Hartmann type have not been used extensively. Such generators are very sensitive to slight pressure changes of the gas entering the nozzle and also to changes in specific distances between certain members of the apparatus. Hence, the generators will operate satisfactorily only under certain very specific conditions. If the extreme sensitivity of this type of acoustic generator could be eliminated, the acoustic generator would become a very valuable industrial source of sonic and supersonic radiations.

As to the applications of sonic and supersonic waves, they include the field of metallurgy, the testing of materials, the dispersion of solids in liquids, the coagulation of aerosols, de-gassing and various chemical effects. These applications have been discussed in the literature.

The present invention has for its object the provision of an acoustic generator of greater efficiency than those heretofore known, whereby the intensity of the vibrations are increased for a given rate of gas flow.

It is a further object of the present invention to provide means for and a method of stabilizing the vibrations produced by an acoustic generator to thereby eliminate, or largely reduce, the sensitivity of generators of the Hartmann type.

It is a further important object of this invention to provide regenerator elements for application to an acoustic generator of the Hartmann type, whereby the intensity of sound vibrations produced by the generator may be greatly increased and the sensitivity of the generator to adjustment may be correspondingly lessened.

It is a further important object of this invention to provide stabilizing elements for reducing the air flow necessary for a given sound intensity and to thereby increase the generator's efficiency.

It is a further important object of this invention to provide regenerator cylinders and pads and stabilizing rods for stabilizing the production of sound and for enabling a clearer sound to be produced without an increase in intensity.

Other and further important objects of this invention will be apparent from the disclosures in the specification and the accompanying drawings.

On the drawings:

Figure 1 is a perspective assembly view of an acoustic generator of the Hartmann type but having improved mechanical features without, however, the regenerator and stabilizing elements of our invention.

Figure 2 is an enlarged longitudinal sectional view, with parts in elevation, of the acoustic generator illustrated in Figure 1, with a stabilizing rod in position.

Figure 3 is an enlarged detail view of the nozzle and oscillator, with parts broken away and in section, and with regenerator pads and stabilizing rod attached.

Figure 4 is an enlarged fragmentary detail view with a regenerator cylinder, or ring, in operative position.

Figure 5 is an enlarged fragmentary view, partly in section of the regenerator cylinder illustrated in Figure 4.

Figure 6 is an enlarged fragmentary view, partly in section, of a modified form of regenerator cylinder.

The reference numeral 10 indicates generally an acoustic generator in its simpler form, without the regenerator and stabilizing elements constituting the improvements of our invention. Said acoustic generator 10 comprises a support having a base 11, provided with apertures 12 for the reception of screws or other securing means 13 for anchoring the base 11 to a table or other support S. A pair of spaced arms 14 and 14a extend vertically upwardly from the base portion 11 and may be integrally formed therewith. The upper end of the arm 14 is provided with a medial vertical slot 15 which extends above and below a horizontal bore 16 for receiving a nipple 17. A thumb screw 18 is fitted into the upper portion of the arm 14 above the bore 16 to extend past the slot 15 into a threaded hole 19. Upon screwing in the thumbscrew 18, the upper bifurcated ends of the arm 14 are drawn together to clamp the nipple 17 in position.

The nipple 17 is connected with a source of fluid under controlled pressure such as a source of compressed air provided with a valve for regulating the pressure to the nipple 17. The nipple 17 is provided with a threaded end 20 for connection with such a source of compressed air (not shown). At the other end said nipple 17 is threaded, as at 21, for receiving a nozzle 22 having a coaxial orifice 23. The nozzle 22 is smoothly tapered internally, as at 24, from the diameter of the nipple 17 to the diameter of the orifice 23.

An oscillator, indicated generally by the reference numeral 25 is mounted in the arm 14a in opposed relationship to the nozzle 22. Said arm 14a is provided with a threaded bore 26, into which is adapted to be threaded the externally threaded body portion 27 of said oscillator 25. A knurled knob 28 formed integrally on the end of said oscillator body portion 27 facilitates manual adjustment thereof. A lock washer 29 is threadedly mounted on the body portion 27 inside of the arm 14a, so that it may be turned up against the inner face of said arm 14a and thereby lock the oscillator 25 in its adjusted position. When further adjustments are to be made, the lock washer 29 is turned back along the threaded portion 27 to enable the oscillator 25 to be threaded into or out of the threaded bore 26.

The oscillator 25 includes a conical head 30, which has a reduced threaded end 31 for reception in a threaded recess 32 in the body portion 27 of said oscillator. The head 30 is provided with a cylindrical bore 33 which extends the full length of said head 30 and is aligned with a bore 34 of the same diameter that extends through the body portion 27. The bore 33 is coaxial with the orifice 23.

At the end of the bore 34 away from the head 30 there is provided a threaded enlarged bore 35 for receiving the threaded end 36 of a depth adjusting element, indicated generally by the reference numeral 37. Said element 37 is provided with a cylindrical rod 38 having a diameter substantially that of said bores 33 and 34 so as to fit snugly therein yet be adjustable axially thereof to vary the depth of the well 39 in the head 30. To facilitate manual adjustment, the element 37 is provided at its threaded end 36 with a knurled knob 40, by means of which the element may be readily turned. The threads on said threaded bore 35 and threaded portion 36 are fine machine threads to permit of micrometer adjustment. A lock washer 41 is mounted upon the threaded portion 36 and may be turned up against the outer face of the knob 28 to hold the element 37 in its adjusted position. For further adjustment, the lock washer 41 is backed away from the face of the knob 28 to permit the element 37 to be threaded into or out of the bore 35. Another adjustment of the adjusting element 37 is indicated in dotted lines in Figure 2.

In the simplest form of generator, such as illustrated in Figure 1, the depth adjusting element 37 must be very carefully adjusted to give the proper depth of the well 39 for any given pressure on the air that is being discharged through the nozzle 22, or otherwise one cannot obtain the desired intensity and quality of sound. For a constant air pressure, any slight change in the depth of the well 39, after once determined, greatly changes the quality of the sound produced and in some instances eliminates the signal completely. As a corollary, if the depth of the well 39 be held constant, similarly erratic results are obtained by varying the pressure on the air going through the nozzle 22. At low pressures, as for instance, less than 25 pounds per square inch gauge pressure, the sound signal may be produced only at intervals as the depth of the well 39 is increased, thus indicating the positions of intervals of instability of the air jet.

The fact that the simple form of acoustic generator, as illustrated in Figure 1 is so extremely sensitive to variables, such as variations in the depth of the well 39 and in the pressure of the air, led us to the development of means for stabilizing the air jets and for diminishing the sensitivity of the apparatus. One of the means that we devised for stabilizing the air jet is illustrated in Figure 2, wherein the depth adjusting element 37 is provided with a stabilizing rod 42 which projects from the end of the rod 38 through the nozzle orifice 23. Said stabilizing rod 42 is of substantially less diameter than the diameter of the orifice 23 and for satisfactory operation should be substantially coaxial therewith.

It is known that when the area of a nozzle orifice is reduced, the power required to force air through the hole at a given pressure is also reduced. Such a procedure would effectively increase the generator efficiency, provided the intensity and other variables remained about the same. Assuming that the phenomenon producing the vibrations in the oscillator was a surface effect of the air jet, tests were made with rods of different diameters placed in the air stream along its axial length to determine whether or not vibrations could still be produced.

As shown in Figure 3, each of the stabilizing rods 42 is made replaceable, as by providing a socket in the end of the rod 38 and a threaded reduced end 43 on said stabilizing rod 42 for threading engagement in said socket.

The presence of a stabilizing rod 42 in the center of the air jet was found to cause almost continuous vibrations for all values of the distance between the end of the head 30 and the end of the nozzle 22. The value of that distance was also much smaller for the same air pressure and depth of the well 39 than was the case when no stabilizing rod was employed. In fact, the distance between the head 30 and the nozzle 22 could be increased to as much as three-quarters of an inch with no apparent change in the intensity and frequency of the wave vibrations, and the limits of this distance were not reached. The stabilizing rod 42, as stated before, had to be substantially in the center of the air jet in order to produce a pure tone.

In addition, we found that the sound intensity could be increased and the air jet stabilized with respect to changes in air pressure or the distance between the head 30 and nozzle 22 by holding solid objects on two sides of the air stream between the nozzle and the oscillator. Two fingers of the hand were used first, and then pencils and bolt heads were tried with the same results.

This discovery led to the construction of a new nozzle which supported two regenerator pads 44 and 45 (Fig. 3). Said pads were made by shaping the heads or ends of bolts, such as the bolts 46. The mounting for the pads 44 and 45 comprises a pair of strips 47 and 48 that are secured by means of screws 49 and 50 to the nozzle 22, on opposite sides thereof. The strips 47 and 48 are provided with threaded apertures through which the threaded portion of the bolts 46 can be inserted and in which said bolts are adjustable for varying the distance between the pads 44 and 45. The bolts 46 may have their free ends squared, as at 51 for the reception of a small socket wrench or for manual operation. The strips 47 and 48 are also provided with elongated slots 52 and 53, respectively, to permit the pads to be adjusted horizontally toward or away from the nozzle orifice 23.

When the regenerator pads 44 and 45 are used, but without the stabilizing rod 42, the intensity of the sound produced at a given air pressure and oscillator well depth was found to be increased by 10 or 12 decibels over the values obtained without the use of the regenerator pads. With the pads present, the frequency was lowered slightly. At a specific distance out, perpendicular to the air stream, the pads seemed to eliminate the sound, but any position along the actual length of the generator gave satisfactory results. One pad gave the same effect as two. The presence of the pad stabilized the generator with respect to changes in the air pressure and the distance between the nozzle and oscillator. Along with an increased stability came a purer tone. The influence of the pads was not as great at high pressures, such as pressures greater than about 25 pounds per square inch, but was very significant at pressures lower than that figure. The size and shape of the pads appeared to make no difference in the results obtained.

With the pads in position, a greater increase in intensity was obtained when the fingers of the hand were placed in a position at a 90° angle to the center line of the pads, one on each side, surrounding the air jets. With such an improvement occurring through the use of pads and fingers, it was reasonable to assume that a cylindrical body entirely surrounding the air stream as an addition to the nozzle would give the same effect. We thereupon tried the use of a regenerator cylinder, such as indicated by the reference numeral 54 (Fig. 4). Said regenerator cylinder 54 comprises a cylindrical portion 55 having a cylindrical aperture 56 for alignment coaxially with the nozzle orifice 23. To permit adjustment, the regenerator cylinder 54 is provided with a threaded stem 57 adapted to be threaded through an apertured strip 58 mounted from the nozzle 22, as by means of a screw 59.

Nuts 60 and 60a may be positioned on either side of the strip 58 for holding the regenerator cylinder 54 in its adjusted position. Similarly, the strip 58 may be provided with an elongated slot 61 to permit adjustment of the regenerator cylinder 54 along the axis of the generator device.

The use of a regenerator cylinder, such as the cylinder 54, produces a very pure tone of vibration at all values of the distance between the nozzle and the head, but the hole 56 of the regenerator cylinder has to be centered fairly exactly with respect to the nozzle orifice 23.

Another form of regenerator cylinder is illustrated in Figure 6, wherein the regenerator cylinder 62 has an aperture 63 provided with a sharp edge 64. The regenerator cylinder 62 produces a large decrease in the frequency of the vibrations as the distance between the nozzle 22 and head 30 is increased.

Since such excellent results were obtained with the regenerator pads, regenerator cylinder and stabilizing rods, tests were made using the combination of the rod and pads and the rod and cylinder in an attempt at further improvement. Using the combination of pads and rod, as illustrated in Figure 3, it was found that the position of the pads along the axial length of the stabilizing rod 42 made no difference, but the distance of the surfaces of the pads 44 and 45 from the rod was very critical. With the pads in proper position a pure tone was produced, and the swishing sound of the air jet was almost completely eliminated. The smaller stabilizing rod 42 could be slightly off center and still produce a good signal when the pads 44 and 45 were used and in proper adjustment.

With the combination of the regenerator cylinder 54, having the straight cylindrical aperture 56, and a stabilizing rod 42, a very pure tone was produced with a lower intensity than was produced with the regenerator cylinder 54 alone. Both the stabilizing rod 42 and the regenerator cylinder 54 had to be substantially centered in order to produce a sound. The sharp edged generator cylinder 62 in combination with the stabilizing rod 42 completely eliminated the sound signal for all values of depth of well, air pressures and distance between nozzle and oscillator head.

Summing up the results obtained, greater stability and a clearer sound signal are produced through the use of a regenerator cylinder, such as either the cylinder 54 or 62. Approximately the same sound intensity and frequency are maintained with or without the cylinder. The straight edged cylinder 54 and the sharp edged cylinder 62 give similar results.

The major results of the use of stabilizing rods, such as the rod 42, are the production of almost continuous sound for all values of the distance between the nozzle and the oscillator head and a definite increase in efficiency at low air pressures. The frequency of the sound is not materially changed by the use of the stabilizing rod, and experimental values obtained are within the limit ($\pm 13\%$) imposed by Hartmann.

The following table shows the relationship between sound intensity and airflow for various diameters of stabilizing rods. In this table, the theoretical air flow N is tabulated with the sound intensity I for several tests so that the relative efficiencies may be compared. In all the tests the value of L, the depth of the oscillator well 39, was held constant at 0.400 inch. The symbols in the table are explained beneath the table.

*Air flow vs. sound intensity*

[$d_o$ = 0.125 inch]

| Test | Remarks | $P_g$, p. s. i. | $I$, db | $W$, lb. per sec. | Per cent of basic flow |
|---|---|---|---|---|---|
| 1 | basis | 10 | 94 | 0.00597 | 100.0 |
| 2 | 1/32 inch rod | 10 | 100 | 0.00558 | 93.5 |
| 3 | 1/16 inch rod | 10 | 94 | 0.00446 | 74.7 |
| 4 | 3/32 inch rod | 10 | 96 | 0.00257 | 43.0 |
| 5 | basis | 25 | 110 | 0.00935 | 100.0 |
| 6 | 1/32 inch rod | 25 | 110 | 0.00874 | 93.5 |
| 7 | 3/32 inch rod | 25 | 100 | 0.00403 | 43.0 |
| 8 | basis | 50 | 120 | 0.01538 | 100.0 |
| 9 | 1/32 inch rod | 50 | 110 | 0.01438 | 93.5 |
| 10 | 1/16 inch rod | 50 | 105 | 0.01150 | 74.7 |
| 11 | 3/32 inch rod | 50 | 104 | 0.00662 | 43.0 |

(Explanation of Symbols)
$d_o$ = diameter of nozzle orifice.
$P_g$ = air pressure, gauge reading in lbs. per square inch.
$I$ = intensity of total sound, in decibels.
$W$ = theoretical amount of air discharged, in lbs. per second.

The stabilizing rod gave the best results at low pressures, as shown by tests 1 to 4 in the above table. All of the sound intensities were about the same, but in test 4 the airflow was only 43% of the original flow. Similar results were found for an air pressure of 25 lbs. per sq./in., at which point the sound intensity decreased only 10 decibels for an airflow decrease 57%. At high pressures the effect was not so noticeable. A comparison of tests 3 and 7 indicates that more intense sound could be produced at higher pressures for the same amount of air used.

These results show that the use of stabilizing rods reduced the air flow necessary for a given sound intensity by as much as 57%, thus greatly increasing the generator efficiency. Stabilizing rods, furthermore, eliminate the need for critical adjustments of the generator and aid in the production of continuous sound for any distance between the nozzle and oscillator. Regenerator pads alone also definitely increase the intensity of sound produced by the acoustic generator and lessen the refinement of generator adjustments required. Similarly, regenerator cylinders by themselves stabilize the production of sound and enable a clearer sound to be produced without an increase in intensity.

While the term "sound" has been used throughout, it is intended to include not only audible sound but also vibrations in the inaudible range. Since it has been simpler to test the acoustic generator of our invention by means of instruments for measuring audible sound, the results have been expressed in terms of audible sound. The acoustic generator is, however, a supersonic as well as a sonic device.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. An acoustic generator comprising a nozzle for producing a fluid jet, an oscillator having a well of adjustable depth that is coaxial with and in spaced opposed relationship to said nozzle, means for adjusting the depth of said well, a solid member extending in the space between said nozzle and said well within said jet, means for holding said member in said position, and means for varying the spacing between the nozzle outlet and the generator inlet.

2. An acoustic generator comprising a generally straight conduit for a compressed fluid having a restricted discharge orifice for producing a fluid jet, an oscillator having a well that is coaxial with and in spaced relationship to said discharge orifice, means for holding said conduit and said oscillator in said relationship, a solid member having a free end extending from said well towards said orifice in spaced relationship to said conduit, and means spaced from said conduit; for adjustably hold said member in said relationship independently of the spacing between said conduit and said oscillator.

3. An acoustic generator comprising a nozzle for producing a fluid jet, an oscillator having a well that is coaxial with and in adjustable spaced opposed relationship to said nozzle, at least one member having opposed surfaces coaxially disposed with respect to said nozzle and extending in the space between said well and said nozzle within said jet, and means for holding said member in said position, said member serving to stabilize said jet and to increase the intensity of the vibrations produced by said generator.

4. An acoustic generator comprising a nozzle for producing a fluid jet, an oscillator having a well of adjustable depth that is coaxial with and in adjustable spaced opposed relationship with said nozzle, means for adjusting the depth of said well, an annular member extending in the space between said well and said nozzle within said jet, and means for holding said member in said position, said member serving to stabilize said jet.

5. An acoustic generator comprising a nozzle for producing a fluid jet, an oscillator having a well that is coaxial with and in spaced opposed relationship to said nozzle, said well being adjustable as to depth, a rod extending from said well toward the orifice of said nozzle, and means for adjustably holding said rod in said position and in coaxial relationship to said orifice.

6. An acoustic generator comprising an orificed nozzle for producing a fluid jet, an oscillator having a well adjustable as to depth that is coaxial with and in adjustable spaced opposed relationship to said nozzle, at least one member having opposed surfaces coaxially disposed with respect to said nozzle and extending in the space between said well and said nozzle within said jet, and means for adjustably holding said member in said position, said member serving to modify and to stabilize said jet.

7. An acoustic generator comprising an orificed nozzle for producing a fluid jet, an oscillator having a well adjustable as to depth that is coaxial with and in adjustable spaced opposed relationship to said nozzle orifice, an annular member extending in the space between said well and said nozzle coaxially with said nozzle orifice and within said jet, and means for holding said member in said position, said member serving to modify said jet.

8. An acoustic generator comprising a nozzle having a circular orifice for producing a fluid jet, an oscillator adjustably supported in spaced relation thereto and having a cylindrical well coaxial with adjustable depth coaxial with said orifice, a rod of substantially less diameter than said orifice extending from said well to said orifice and being coaxial therewith, and means for holding said rod in said position.

9. An acoustic generator comprising a nozzle having a circular orifice for producing a fluid jet, an oscillator adjustably supported in spaced relation thereto and having a cylindrical well of adjustable depth coaxial with said orifice, an annular member coaxially disposed with respect to said orifice in the space between said well and said nozzle within said jet, and means for adjustably holding said member in said position.

10. An acoustic generator comprising a nozzle having a circular orifice for producing a fluid jet, an oscillator adjustably supported in spaced relation thereto and having a cylindrical well of adjustable depth coaxial with said orifice, at least one member having opposed surfaces coaxially disposed with respect to said nozzle and extending in the space between said well and said nozzle within said jet, and means for adjustably holding said member in said position.

11. An acoustic generator comprising a nozzle having a circular orifice for producing a fluid jet, an oscillator adjustably supported in spaced relation thereto and having a cylindrical well of adjustable depth coaxial with said orifice, a rod of substantially less diameter than said orifice extending from said well to said orifice and coaxial with said orifice, a solid member extending in the space between said well and said nozzle within and in eccentric relationship to said jet, means for holding said rod in said position, and means for adjustably holding said member in said position.

12. An acoustic generator comprising a nozzle having a circular orifice for producing a fluid jet, an oscillator adjustably supported in spaced relation thereto and having a cylindrical well of adjustable depth coaxial with said orifice, a rod of substantially less diameter than said orifice extending from said well to said orifice and arranged coaxially with said orifice, a solid member extending in the space between said well and said nozzle within said jet in spaced relationship to said rod, means for holding said rod in said position, and means for adjustably holding said member in said position.

13. An acoustic generator comprising a nozzle for producing a fluid jet, an oscillator having a well that is coaxial with and in spaced opposed relationship to said nozzle, said well being adjustable as to depth, means for adjusting the depth of said well, a solid member extending in the space between said nozzle and said well within said jet, and means for holding said member in said position.

14. An acoustic generator comprising a nozzle for producing a fluid jet, an oscillator having a well that is coaxial with and in spaced opposed relationship to said nozzle, said well being adjustable as to depth, means for adjusting the depth of said well, a solid member extending in the space between said nozzle and said well within said jet, means for holding said member in said position, and means for varying the spacing between the nozzle outlet and the generator inlet.

JOHN I. YELLOTT.
LEONARD E. SAVORY.

REFERENCES CITED

The following references are of record in the file of this patent:

UNITED STATES PATENTS

| Number | Name | Date |
|---|---|---|
| 1,515,471 | Foley | Nov. 11, 1924 |
| 1,723,902 | Wainwright | Aug. 6, 1929 |
| 1,890,212 | Bridgham | Dec. 6, 1932 |
| 1,980,171 | Amy | Nov. 13, 1934 |
| 2,238,668 | Wellenstein | Apr. 15, 1941 |
| 2,245,454 | Leavens | June 10, 1941 |

OTHER REFERENCES

"The Hartmann Acoustic Generator," Engineering 142: 491–1936. Filed in Div. 34 in Class 116/137–A.

"On a New Method for Generation of Soundwaves," Physical Review S. 2. V. 20, 1922, pages 719–727. Filed in Div. 34 in Class 116/137–A.

"A New Acoustic Generator," J. Hartmann and Birgot Tralle. Filed in Div. 34 in Class 116/137–A.